(12) United States Patent
Fazeli et al.

(10) Patent No.: US 9,446,859 B2
(45) Date of Patent: Sep. 20, 2016

(54) SINGLE-STAGE, SEPARATED GAS-FLUID SHOCK ABSORBER SERVICING

(71) Applicant: GOODRICH CORPORATION, Charlotte, NC (US)

(72) Inventors: Amir Fazeli, Milton (CN); Adnan Cepic, Misssissauga (CN); Susanne Reber, Middleburgh Heights, OH (US)

(73) Assignee: Goodrich Corporation, Charlotte, NC (US)

( * ) Notice: Subject to any disclaimer, the term of this patent is extended or adjusted under 35 U.S.C. 154(b) by 137 days.

(21) Appl. No.: 14/493,052

(22) Filed: Sep. 22, 2014

(65) Prior Publication Data

US 2016/0052647 A1 Feb. 25, 2016

Related U.S. Application Data

(63) Continuation-in-part of application No. 14/463,323, filed on Aug. 19, 2014.

(51) Int. Cl.
*B64F 5/00* (2006.01)
*F16F 9/46* (2006.01)

(52) U.S. Cl.
CPC . *B64F 5/00* (2013.01); *F16F 9/46* (2013.01); *B64F 2700/623* (2013.01); *Y10T 29/49718* (2015.01); *Y10T 29/49776* (2015.01)

(58) Field of Classification Search
CPC ....... B64F 5/00; B64F 2700/623; F16F 9/43; Y10T 29/49776; Y10T 29/49718
See application file for complete search history.

(56) References Cited

U.S. PATENT DOCUMENTS

| 5,148,896 A | * | 9/1992 | Ralph | B64C 25/60 188/314 |
|---|---|---|---|---|
| 2008/0163668 A1 | | 7/2008 | Kurtz et al. | |
| 2014/0046533 A1 | | 2/2014 | Nance | |

FOREIGN PATENT DOCUMENTS

GB 2170294 7/1986

OTHER PUBLICATIONS

Extended European Search Report dated Mar. 15, 2016 in European Application No. 15181059.5.

* cited by examiner

*Primary Examiner* — John C Hong
(74) *Attorney, Agent, or Firm* — Snell & Wilmer, L.L.P.

(57) ABSTRACT

The present disclosure includes methods for servicing shock struts. Such shock struts may be "air over oil" type, having a gas portion and a liquid portion of a sealed fluid chamber. Methods in accordance with the disclosure include pressurizing the gas portion to a first pressure, then pressurizing the liquid portion until a final pressure is achieved in the gas portion.

15 Claims, 3 Drawing Sheets

SINGLE-STAGE, SEPARATED GAS-FLUID SHOCK ABSORBER SERVICING

CROSS-REFERENCE TO RELATED APPLICATIONS

This application claims priority to and is a continuation-in-part application of U.S. patent application Ser. No. 14/463,323 entitled "Single-Stage, Separated Gas-Fluid Shock Absorber Servicing" and filed Aug. 19, 2014, the contents of which are hereby incorporated by reference in their entirety.

FIELD

The present disclosure relates generally to shock strut assemblies and, more specifically, to systems and methods for servicing shock struts.

BACKGROUND

Conventionally, various types of aircraft utilize shock strut assemblies to assist in reducing and managing energy transmitted from landing gear to the structure of an aircraft to which the landing gear is attached. Such shock strut assemblies often utilize a separated gas-fluid shock strut. Typically, servicing of these shock struts starts by adjusting the oil volume to a desired level. This is achieved by servicing the shock strut in the fully compressed position wherein the shock strut internal volume is known or using stroke measurement devices to set the shock strut internal volume to a known value. Then the gas chamber is pressurized to a desired gas operating pressure. Such methods typically comprise an air bleeding procedure during oil servicing to ensure that the shock strut is serviced with a right volume of oil. Moreover, gas is normally serviced at a relatively high pressure. Methods for servicing shock struts that do not require air bleeding and high gas servicing pressure may be desirable to reduce the complexity of the servicing task and associated equipment.

SUMMARY

A method for servicing of a shock strut in accordance with the present disclosure may comprise providing a shock strut comprising a cylinder, a piston, and a sealed fluid chamber wherein the sealed fluid chamber comprises a gas portion and a liquid portion, pressurizing the gas portion to a first servicing gas pressure, and pressurizing the liquid portion until a second servicing gas pressure is achieved in the gas portion. The first servicing gas pressure may be less than the second servicing gas pressure. The gas of gas portion may comprise nitrogen. The liquid of liquid portion may comprise an oil. The liquid portion may comprise a liquid valve, and the step of pressuring the liquid portion may comprise pumping oil into the sealed fluid chamber. Similarly, the gas portion may comprise a gas valve, and the step of pressuring the gas portion to the first servicing gas pressure may comprise pressurizing the gas portion through the gas valve.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

In various embodiments of the present disclosure, service is provided to a shock strut to ensure desired and predetermined performance of the shock strut. Although this disclosure may apply to both a separated gas-fluid shock strut and an actuator, for the sake of conciseness and consistency, reference will be made hereafter to a shock strut. In contrast to conventional shock strut servicing methods, the present disclosure describes methods for servicing that pressurize the gas portion of the strut to an initial pressure, and then pressurize the liquid portion until a second, higher pressure is achieved in the gas portion.

Figure 1B:
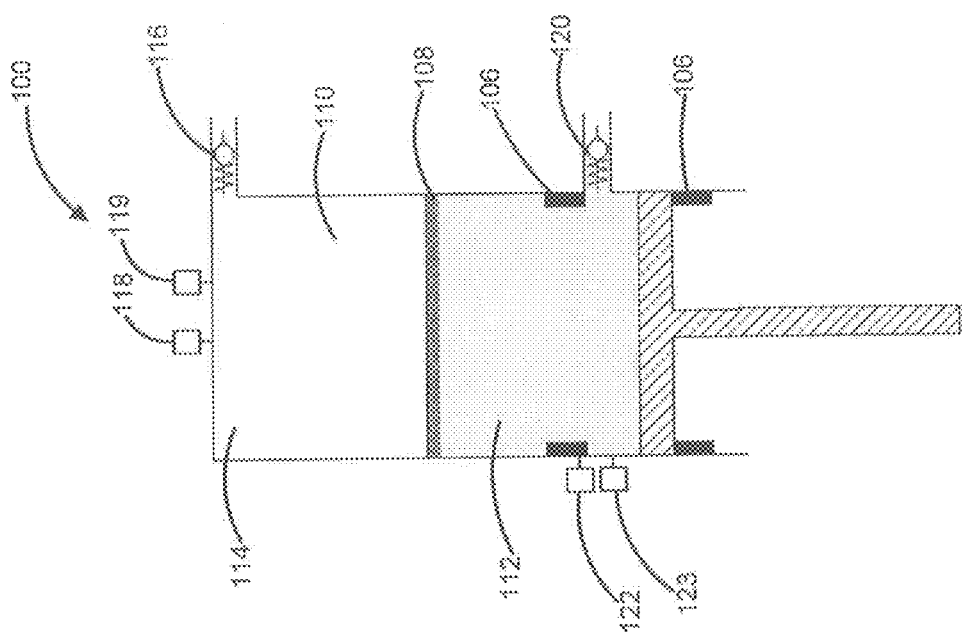
FIGS. 1A and 1B illustrate, respectively, cross sectional views of a shock strut in accordance with the present disclosure.
Figure 1A:
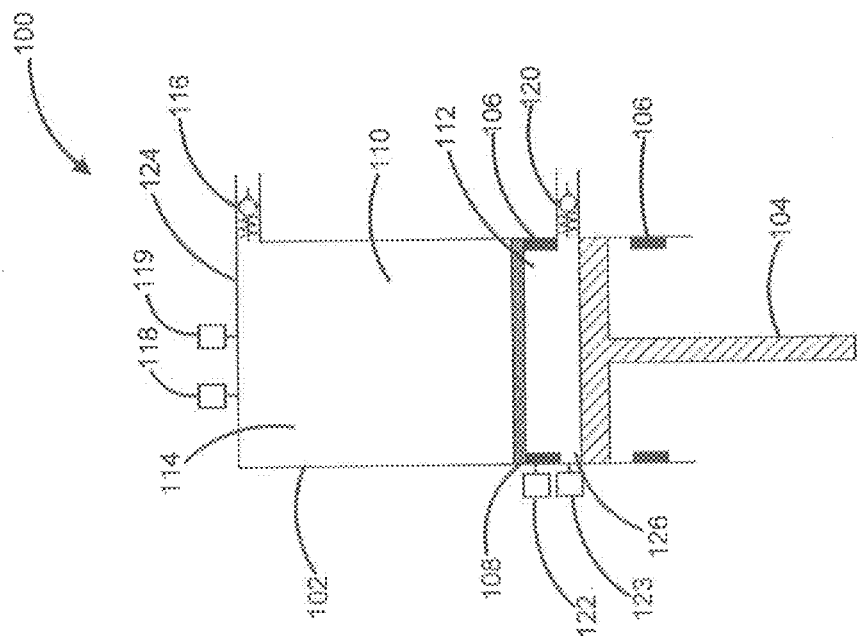

Accordingly, with reference to FIGS. 1A and 1B, a shock strut 100 is illustrated. In various embodiments, shock strut 100 comprises a cylinder 102 and a piston 104. Cylinder 102 may be configured to receive piston 104 in a manner that allows the two components to telescope together and absorb and/or dampen forces transmitted by a wheel assembly (not pictured). Further, cylinder 102 may comprise one or more mechanical stops 106. In various embodiments, mechanical stops 106 limit the position to which piston 104 may travel in the upward or downward directions within cylinder 102.

Cylinder 102 and piston 104 may, for example, comprise a sealed fluid chamber 110. In various embodiments, sealed fluid chamber 110 is configured such that fluid contained within it is unable to leak as piston 104 moves relative to cylinder 102.

In various embodiments, sealed fluid chamber 110 comprises a liquid portion 112. Liquid portion 112 may comprise a hydraulic fluid or oil.

Further, sealed fluid chamber 110 may further comprise a gas portion 114. Gas portion 114 may comprise a gas such as nitrogen. Conventionally, this arrangement is referred to as an "air-over-oil" arrangement.

Gas portion 114 and liquid portion 112 may, for example, be separated by a floating piston 108. In various embodiments, floating piston 108 is disposed and can freely travel within cylinder 102. For example, floating piston 108 may travel between the top of cylinder 102 and one or more mechanical stops 106.

Shock strut 100 may further comprise, for example, a gas valve 116. In various embodiments, gas valve 116 may be positioned near a top 124 of gas portion 114 of sealed fluid chamber 110. Shock strut 100 may further comprise a gas temperature sensor 118. In various embodiments, gas temperature sensor 118 may be located near or within gas valve 116. Shock strut 100 may further comprise a gas pressure sensor 119. Gas pressure sensor 119 may, for example, be located near or within gas valve 116. However, any positioning of gas valve 116, gas temperature sensor 118, and gas pressure sensor 119 is within the scope of the present disclosure. Alternatively, gas pressure and gas temperature may be measured manually using offline devices such as, for example, a dial gauge.

In various embodiments, shock strut 100 comprises a liquid valve 120. For example, liquid valve 120 may be positioned near the bottom 126 of liquid portion 112 of sealed fluid chamber 110. Shock strut 100 may further comprise a liquid temperature sensor 122 and/or a liquid pressure sensor 123. In various embodiments, liquid temperature sensor 122 and/or liquid pressure sensor 123 may be located near or within liquid valve 120. However, any positioning of liquid valve 120, liquid temperature sensor 122, and liquid pressure sensor 123 is within the scope of the present disclosure.

For example, the use of gas temperature sensor 118 and/or liquid temperature sensor 122, and/or offline measurement of these parameters using manual gauges, may allow for compensation of expansion or contraction of the liquid due to temperature and pressure variations during servicing by providing accurate temperature readings during the servicing procedure. Thus, servicing may, for example, be performed over a wider range of temperatures than conventional servicing methods. Moreover, temperature compensation may allow the shock strut internal fluid levels to be independent from the servicing temperature.

Figure 2:
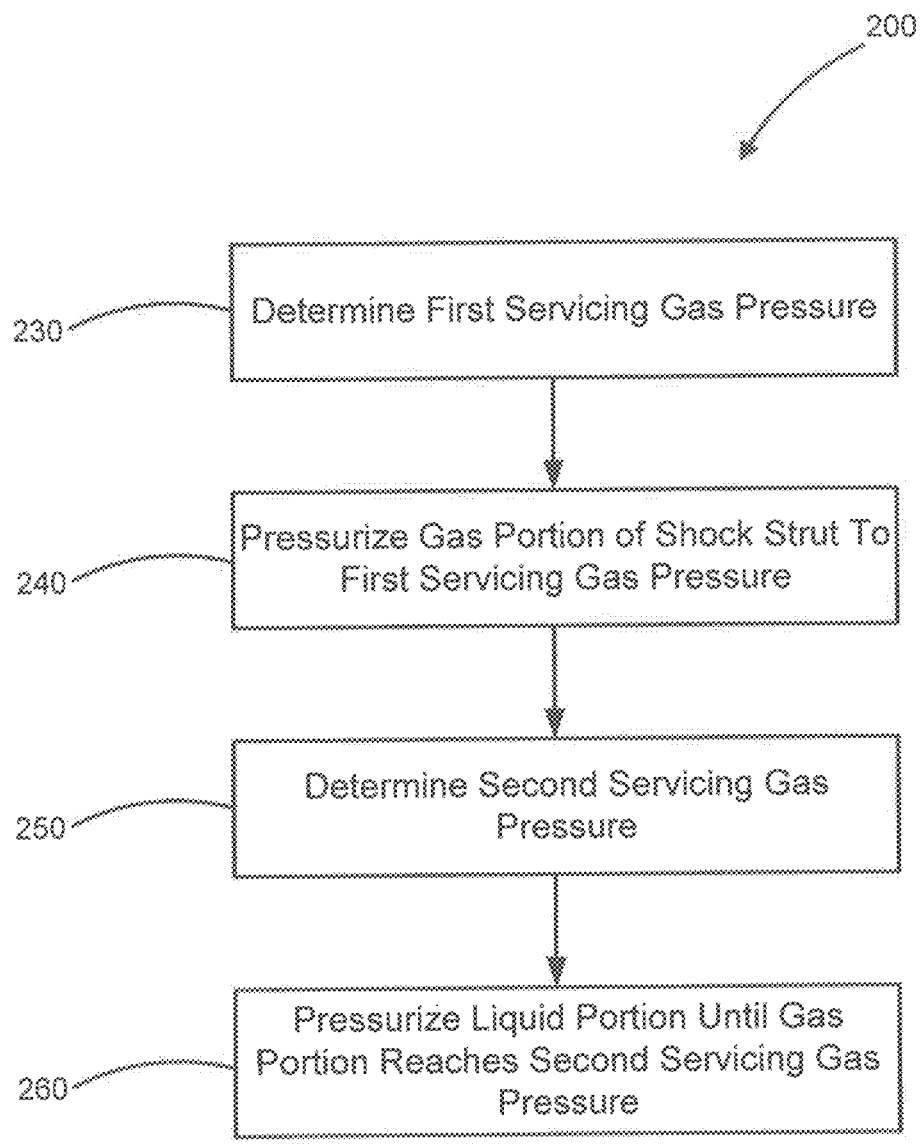
FIG. 2 illustrates a method for servicing a shock strut in accordance with the present disclosure.

With reference to FIG. 2, a method 200 for servicing a shock strut is illustrated. Method 200 may, for example, comprise a method for ensuring that a shock strut, such as shock strut 100, has predetermined volumes and pressures of gas and liquid regardless of the servicing temperature.

In various embodiments, method 200 comprises a step 230 of determining a first servicing gas pressure. For example, the first servicing gas pressure may be calculated using the following equation:

$$P_{gas,servicing,1} = P_{gas,nom} \times \frac{V_{tot} - V_{oil,nom}}{V_{gas,max}} \times \frac{T_{gas,servicing}}{T_{nom}}$$

Where P(gas,nom) is the nominal servicing pressure, Tnom is the nominal servicing temperature, T(gas,servicing) is the ambient or gas temperature at which servicing is performed, V(oil,nom) is the nominal oil volume at Tnom, Vtot is the total internal volume of sealed fluid chamber 110 and 112, and V(gas,max) is the volume available to gas when there is no oil in the shock strut and floating piston 108 is pushed to upper mechanical stop 106.

First servicing gas pressure may, for example, be significantly lower than gas pressures at which conventional servicing methods pressurize shock struts. For example, conventional methods of servicing shock struts typically pump liquid into the shock strut, then add gas to achieve a final gas pressure. In such conventional methods, the gas portion may be pressurized to more than 3,000 psi or $2.1 \times 10^4$ kPa. In various embodiments of the present disclosure, the first servicing gas pressure of method 200 may be significantly less than 3,000 psi or $2.1 \times 10^4$ kPa. For example, first servicing gas pressure may be less than about 2,000 psi or $1.4 \times 10^4$ kPa, such as, 1,990 psi or $1.37 \times 10^4$ kPa.

Method 200 may further comprise, for example, a step 240 of pressurizing the gas portion of the shock strut to the first servicing gas pressure. For example, gas may be added to gas portion 114 of sealed fluid chamber 110 via gas valve 116 until the first servicing gas pressure is achieved. In various embodiments, step 240 comprises pressurizing gas portion 114 to a pressure less than the shock strut operating pressure. For example, a nitrogen gas vessel at or near 3,000 psi or $2.1 \times 10^4$ kPa may be used to introduce nitrogen gas into gas portion 114 to achieve first servicing gas pressure.

Method 200 may further comprise, for example, a step 250 of determining a second servicing gas pressure. For example, in various embodiments, step 240 results in floating piston 108 being positioned at mechanical stop 106, the second servicing gas pressure may be determined by the following equations:

$$P_{gas,servicing,2} = P_{gas,nom} \times \frac{T_{gas,servicing}}{T_{nom}} \times \frac{V_{tot} - V_{oil,nom}}{V_{tot} - V_{oil@T_{gas,servicing} \& P_{gas,servicing,2}}},$$

where $$V_{oil@T_{gas,servicing} \& P_{gas,servicing,2}} = V_{oil,nom} \times (1 + \alpha(T_{gas,servicing} - T_{nom})) \times \left(1 - \frac{P_{gas,servicing,2} - P_{gas,nom}}{B}\right).$$

Where Tnom is the nominal servicing temperature, T(gas, servicing) is the ambient temperature at which servicing is performed, V(oil,nom) is the nominal oil volume at Tnom, Vtot is the volume of sealed fluid chamber 110, Pgas,nom is the nominal pressure of the gas at Tnom, V(oil@Tgas, servicing&Pgas,servicing2) is the volume of oil at T(gas, servicing) and P(gas,servicing2), α is the thermal expansion coefficient of the oil, and B is the oil bulk modulus. In various embodiments, second servicing gas pressure may be higher than the first servicing pressure and the pressure of the gas vessel used to achieve the first servicing setpoint.

In further embodiments, step 250 may comprise determining the second servicing gas pressure when the piston 104 is not positioned at mechanical stop 106 (in other words, when shock strut 100 is not fully extended) using the following equations:

$$P_{gas,servicing,2} = P_{gas,nom} \times \frac{T_{gas,servicing}}{T_{nom}} \times \frac{V_{tot} - V_{oil,nom}}{V_{tot} - A_p S - V_{oil@T_{gas,servicing} \& P_{gas,servicing,2}}}$$

and $$V_{oil@T_{gas,servicing} \& P_{gas,servicing,2}} = V_{oil,nom} \times (1 + \alpha(T_{gas,servicing} - T_{nom})) \times \left(1 - \frac{P_{gas,servicing,2} - P_{gas,nom}}{B}\right).$$

Where Ap is surface area of the piston and S is stroke of shock strut 100.

Figure 3:
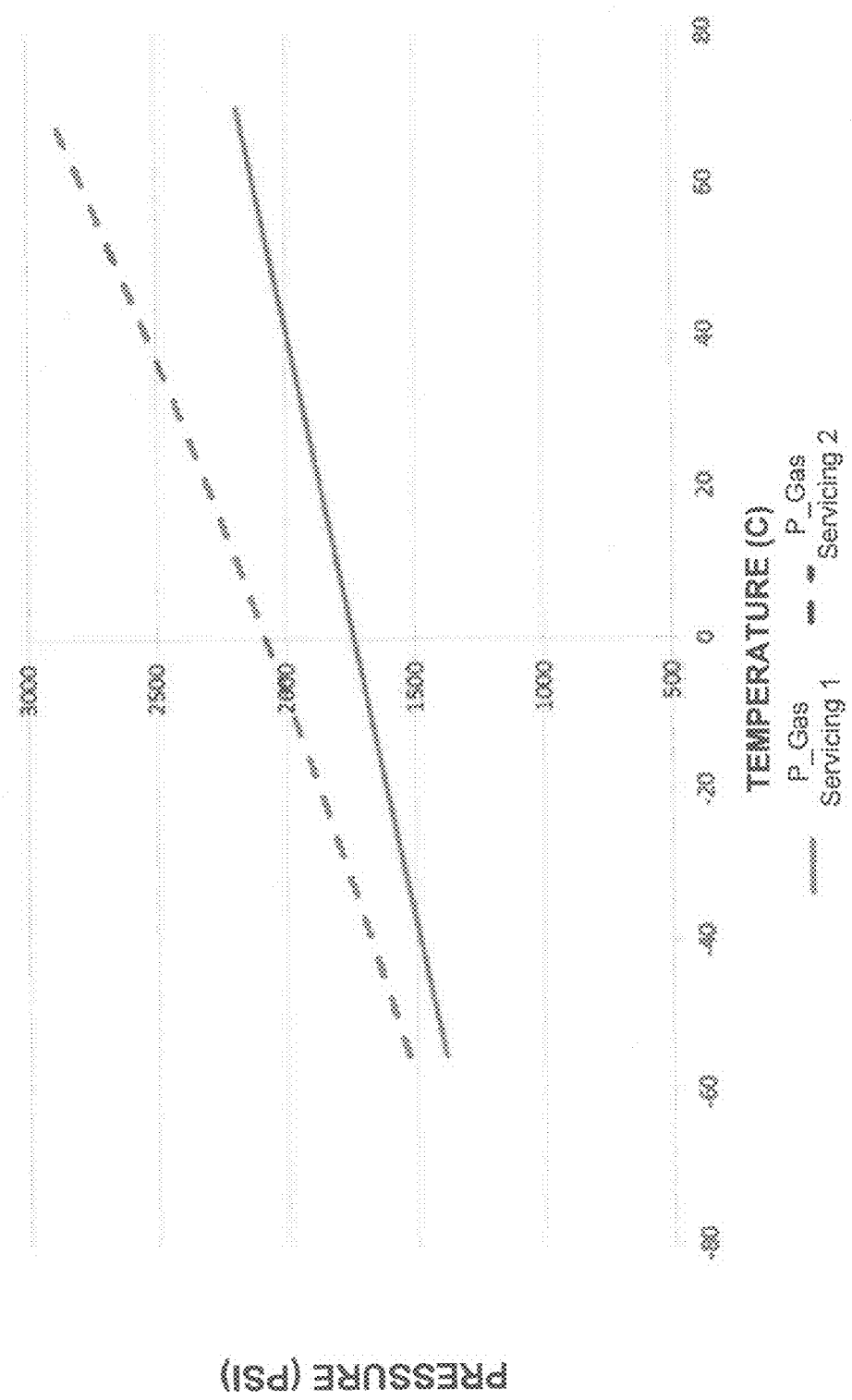
FIG. 3 illustrates a graphical depiction of various first servicing gas pressures and second servicing gas pressures at various temperatures in accordance with the present disclosure.

With reference to FIG. 3, various first servicing gas pressures and second servicing gas pressures are illustrated at various servicing temperatures for a typical shock strut. For example, at about 40° C., the first servicing gas pressure is about 1,990 psi (1.37×10⁴ kPa) and the second servicing gas pressure is about 2,480 psi (1.71×10⁴ kPa). If such a chart is available, it may be used to graphically estimate the first servicing gas pressure and second servicing gas pressure.

In various embodiments, method 200 further comprises a step 260 of pressurizing the liquid portion until the second servicing gas pressure is achieved in the gas portion. Step 260 may comprise, for example, pressurizing liquid portion 112 of shock strut 100 via liquid valve 120 while monitoring the pressure in gas portion 114 through gas valve 116. In various embodiments, the liquid of liquid portion 112 is pressurized until the gas of gas portion 114 achieves the second servicing gas pressure calculated in step 250. Once second servicing gas pressure is achieved in gas portion 114, liquid valve 120 may be closed.

In various embodiments, oil chamber is serviced at a significantly higher pressure compared to conventional methods. At high pressures, the volume of the trapped air in the oil chamber becomes significantly smaller and, consequently, there may be no need for air bleeding.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for servicing a shock strut system comprising:
providing a shock strut comprising a cylinder, a piston, and a sealed fluid chamber, wherein the sealed fluid chamber comprises a gas portion and a liquid portion;
determining a gas servicing temperature;
calculating a first servicing gas pressure based on the gas servicing temperature;
pressurizing the gas portion to the first servicing gas pressure; and
pumping a liquid into the liquid portion until a second servicing gas pressure is achieved in the gas portion.

2. The method of claim 1, further comprising calculating the second servicing gas pressure utilizing the equations:

$$P_{gas,servicing,2} = P_{gas,nom} \times \frac{T_{gas,servicing}}{T_{nom}} \times \frac{V_{tot} - V_{oil,nom}}{V_{tot} - A_p S - V_{oil@T_{gas,servicing} \& P_{gas,servicing,2}}}$$

and $$V_{oil@T_{gas,servicing} \& P_{gas,servicing,2}} = V_{oil,nom} \times (1 + \alpha(T_{gas,servicing} - T_{nom})) \times \left(1 - \frac{P_{gas,servicing,2} - P_{gas,nom}}{B}\right).$$

3. The method of claim 2, wherein the gas servicing temperature is determined by measuring an ambient temperature or a shock strut body temperature.

4. The method of claim 1, wherein the first servicing gas pressure is less than the second servicing gas pressure.

5. The method of claim 1, wherein a gas of the gas portion comprises nitrogen.

6. The method of claim 1, wherein the liquid of the liquid portion comprises an oil.

7. The method of claim 1, wherein the gas portion comprises a gas valve, and the step of pressurizing the gas portion to the first servicing gas pressure comprises pressurizing the gas portion through the gas valve.

8. The method of claim 1, wherein one of the gas portion and the liquid portion comprises at least one of a temperature sensor and a pressure sensor.

9. A method for servicing a shock strut system comprising:
providing a shock strut comprising a cylinder, a piston, and a sealed fluid chamber, wherein the sealed fluid chamber comprises a gas portion and a liquid portion;
determining a servicing temperature;
determining a first servicing gas pressure;

pressurizing the gas portion to the first servicing gas pressure;

determining a second servicing gas pressure based on the servicing temperature; and pressurizing the liquid portion until the second servicing gas pressure is achieved in the gas portion.

10. The method of claim 9, wherein the first servicing gas pressure is less than the second servicing gas pressure.

11. The method of claim 9, wherein the step of determining the second servicing gas pressure comprises utilizing the equations:

$$P_{gas,servicing,2} = P_{gas,nom} \times \frac{T_{gas,servicing}}{T_{nom}} \times \frac{V_{tot} - V_{oil,nom}}{V_{tot} - A_p S - V_{oil@T_{gas,servicing} \& P_{gas,servicing,2}}}$$

and $$V_{oil@T_{gas,servicing} \& P_{gas,servicing,2}} = V_{oil,nom} \times (1 + \alpha(T_{gas,servicing} - T_{nom})) \times \left(1 - \frac{P_{gas,servicing,2} - P_{gas,nom}}{B}\right).$$

12. The method of claim 9, wherein the steps of determining the first servicing gas pressure and determining the second servicing gas pressure comprise referring to at least one of a graphical illustration or a chart of servicing pressure data.

13. The method of claim 9, wherein the gas portion comprises a gas valve, and the step of pressuring the gas portion to the first servicing gas pressure comprises pressurizing the gas portion through the gas valve.

14. The method of claim 9, wherein one of the gas portion and the liquid portion comprises at least one of a temperature sensor and a pressure sensor.

15. The method of claim 9, wherein the liquid portion comprises a liquid valve, and the step of pressurizing the liquid portion comprises pressurizing the liquid portion through the liquid valve.

\* \* \* \* \*